United States Patent
Green et al.

(10) Patent No.: US 6,506,805 B2
(45) Date of Patent: Jan. 14, 2003

(54) MAGNESIUM AMMONIUM PHOSPHATE HEXAHYDRATE AND MONOHYDRATE SLURRIES

(76) Inventors: J. Richard Green, 3501 Kirchwood Dr., Plainview, TX (US) 79072; Warren D. Winterson, PO Box 323, West Point, VA (US) 23181

( * ) Notice: Subject to any disclaimer, the term of this patent is extended or adjusted under 35 U.S.C. 154(b) by 0 days.

(21) Appl. No.: 09/932,295

(22) Filed: Aug. 17, 2001

(65) Prior Publication Data

US 2002/0114753 A1 Aug. 22, 2002

Related U.S. Application Data

(63) Continuation-in-part of application No. 09/641,110, filed on Aug. 17, 2000.

(51) Int. Cl.$^7$ .............. B01F 3/12; C01B 25/26; C05G 5/00
(52) U.S. Cl. ............... 516/88; 71/33; 71/36; 71/42; 71/64.08; 423/306
(58) Field of Search ............... 516/88; 71/33, 71/36, 42, 64.08; 423/306

(56) References Cited

U.S. PATENT DOCUMENTS

| | | | |
|---|---|---|---|
| 3,126,254 A | * 3/1964 | Salutsky et al. | 423/306 |
| 3,141,732 A | * 7/1964 | McCukkough et al. | 423/306 |
| 3,181,943 A | * 5/1965 | Bridger et al. | 71/36 |
| 3,320,048 A | * 5/1967 | Legal et al. | 71/33 |
| 3,384,451 A | * 5/1968 | Volz | 423/306 |
| 3,459,530 A | * 8/1969 | Hudson | 71/33 |
| 3,476,510 A | * 11/1969 | Kern et al. | 423/306 |
| 3,585,020 A | * 6/1971 | Legal, Jr. et al. | 71/36 |
| 4,013,443 A | 3/1977 | Schuman | 71/31 |
| 4,153,441 A | 5/1979 | Guithues et al. | 71/34 |
| 4,402,986 A | 9/1983 | Sinkoff et al. | 426/41 |
| 4,436,555 A | 3/1984 | Sugama et al. | 106/690 |
| 4,457,773 A | 7/1984 | Sley | 71/33 |
| 4,460,555 A | 7/1984 | Thompson | 423/309 |
| 4,777,026 A | 10/1988 | Griffith | 423/305 |
| 5,294,348 A | 3/1994 | Horny et al. | 210/724 |
| 5,613,465 A | 3/1997 | Moore | 119/230 |

OTHER PUBLICATIONS

International Search Report, ISA European Patent Office, dated Dec. 18, 2001.*
Database Derwent on East, week 198652, London: Derwent Publications Ltd., AN– 1986–345802, SU 1234362 A (Kaluga Hallurgy Research), abstract.*
"Hydration/dehydration characteristics of struvite and dittmarite pertaining to magnesium ammonium phosphate cement systems"; A.K. Sarkar; Metals and Ceramics Division, University of Dayton Research Institute; *Journal of Materials Science* 26 (1991) 2514–2518 Month unknown.
"The Phase System $MgO–(NH_4)_2O–P_2O_5–H_2$ at 25° C"; A. W. Frazier, K. J. Waerstad; Chemical Research Department, Tennesse Valley Authority; *Ind. Eng. Chem. Res.*, vol. 31, No. 8, 1992. Month unknown.
"Crystallization of Two Magnesium Phosphates, Struvite and Newberyite: Effect of pH and Concentration"; F. Abbona, H.E. Lundager Madsen and R. Boistelle; *Journal of Crystal Growth* 57 (1982) 6–14. Month unknown.

* cited by examiner

*Primary Examiner*—Daniel S. Metzmaier
(74) *Attorney, Agent, or Firm*—Baker Botts L.L.P.

(57) ABSTRACT

A magnesium ammonium phosphate slurry and method of producing magnesium ammonium phosphate slurries. The method provides for obtaining a magnesium hydroxide supply having a small particle size of about 2 microns. Aqua ammonia and phosphoric acid are sequentially added while maintaining the temperature at below 110° F. The magnesium ammonium phosphate hexahydrate slurry formed has a small particle size of about 2 to 7 microns. The hexahydrate slurry may be converted to a monohydrate slurry having a particle size of less than about 8 microns by heating to the boiling point in the presence of excess water or heating to the boiling point while maintaining a very moderate hydrostatic pressure.

18 Claims, 2 Drawing Sheets

MAGNESIUM AMMONIUM PHOSPHATE HEXAHYDRATE AND MONOHYDRATE SLURRIES

RELATED APPLICATIONS

This application is a continuation-in-part of pending U.S. patent application Ser. No. 09/641,110, filed Aug. 17, 2000, entitled "Magnesium Ammonium Phosphate Hexahydrate Slurry".

BACKGROUND OF THE INVENTION

1. Field of the Invention

The present invention relates to the production of magnesium ammonium phosphate slurries. More particularly, the invention relates to magnesium ammonium phosphate hexahydrate slurries having a particle size of about 2 to 7 microns and monohydrate slurries having a particle size of less than about 8 microns.

2. Description of the Related Art

Magnesium ammonium phosphate is a known, naturally occurring mineral which exists in a number of forms, including the hexahydrate form ("struvite") and the monohydrate form ("dittmarite"). The production of solid forms of magnesium ammonium phosphate are known and are used for purposes such as fertilizer, nutrients for cultured growths, treatment of waste water, and treatment of animal waste. For these uses, the magnesium ammonium phosphate is usually manufactured and supplied in dry granular form. The dry granular form may be used for a number of purposes, e.g., broadcast as a fertilizer.

Magnesium ammonium phosphate has a low solubility in water and the dry granular magnesium ammonium phosphate may be dispersed in water to produce a slurry. In the past, all known slurries of magnesium ammonium phosphate have a particle size of at least about 10 microns or larger. There are a number of shortcomings with slurries having this particle size, e.g., the magnesium ammonium phosphate settles out of suspension, poor consistency when dispersed, and poor control over reactions when magnesium ammonium phosphate is a reactant.

SUMMARY OF THE INVENTION

Accordingly, a need has arisen for magnesium ammonium phosphate hexahydrate slurries having a particle size of about 2 to about 7 microns and monohydrate slurries having a particle size of less than about 8 microns. This significantly reduces settling and provides for improved consistency and reaction with other compounds.

In accordance with the present invention, a method of producing magnesium ammonium phosphate hexahydrate and monohydrate slurries is provided that significantly reduces the particle size and thereby improves the settling, consistency and reaction with other compounds. The process is composed of the following steps: first, using a magnesium hydroxide supply having very small particle size, a water/magnesium hydroxide slurry is formed. Second, an ammonium source is added. Third, while maintaining an ammonia excess and controlling the temperature to a maximum of about 110° F., phosphoric acid is added. This produces a hexahydrate slurry. The hexahydrate slurry may be converted to a monohydrate slurry by heating to the boiling point in the presence of excess water at atmospheric pressure or heating to the boiling point while maintaining a very moderate hydrostatic pressure.

Accordingly, an object of the present invention is to provide magnesium ammonium phosphate hexahydrate slurries having a particle size in the 2 to 7 micron range and monohydrate slurries having a particle size of less than about 8 microns which provides for the advantages of reduced settling, improved consistency when dispersed and improved reaction with other compounds.

BRIEF DESCRIPTION OF THE DRAWINGS

A better understanding of the invention can be obtained when the detailed description of exemplary embodiments set forth below is considered in conjunction with the attached drawings in which.

DETAILED DESCRIPTION OF THE EXEMPLARY EMBODIMENTS

1. Starting Materials

It is important that the magnesium hydroxide powder obtained has a particle size of generally about 2 microns; preferably, with the obtained magnesium hydroxide, at least about 55 wt. % of particles have a size less than about 2 microns. Such a magnesium hydroxide may be purchased from Martin Marietta of Manistee, Michigan as MAG-SHIELD UF. Also, Martin Marietta will specially mill its MAGSHIELD UF magnesium hydroxide powder such that about 65 wt. % of the particles are less than about 2 microns in size.

The ammonia starting material is preferably an aqua ammonia (ammonium hydroxide) solution. These solutions are generally commercially available in concentrations of from about 19 wt. % to about 29 wt. %; preferably, the concentration is about 29 wt. %. Alternatively, anhydrous ammonia may also be used.

The phosphate starting material is preferably a phosphoric acid solution. Phosphoric acid is commercially available in a wide range of concentrations; preferably, the concentration is about 75 wt. %.

For all of the above listed starting materials, it is preferred that the materials be purchased without additives, e.g., surfactants, emulsifying agents, etc.

The water may be from any convenient source. It is preferred not to use chlorinated water.

2. Process

Figure 1:
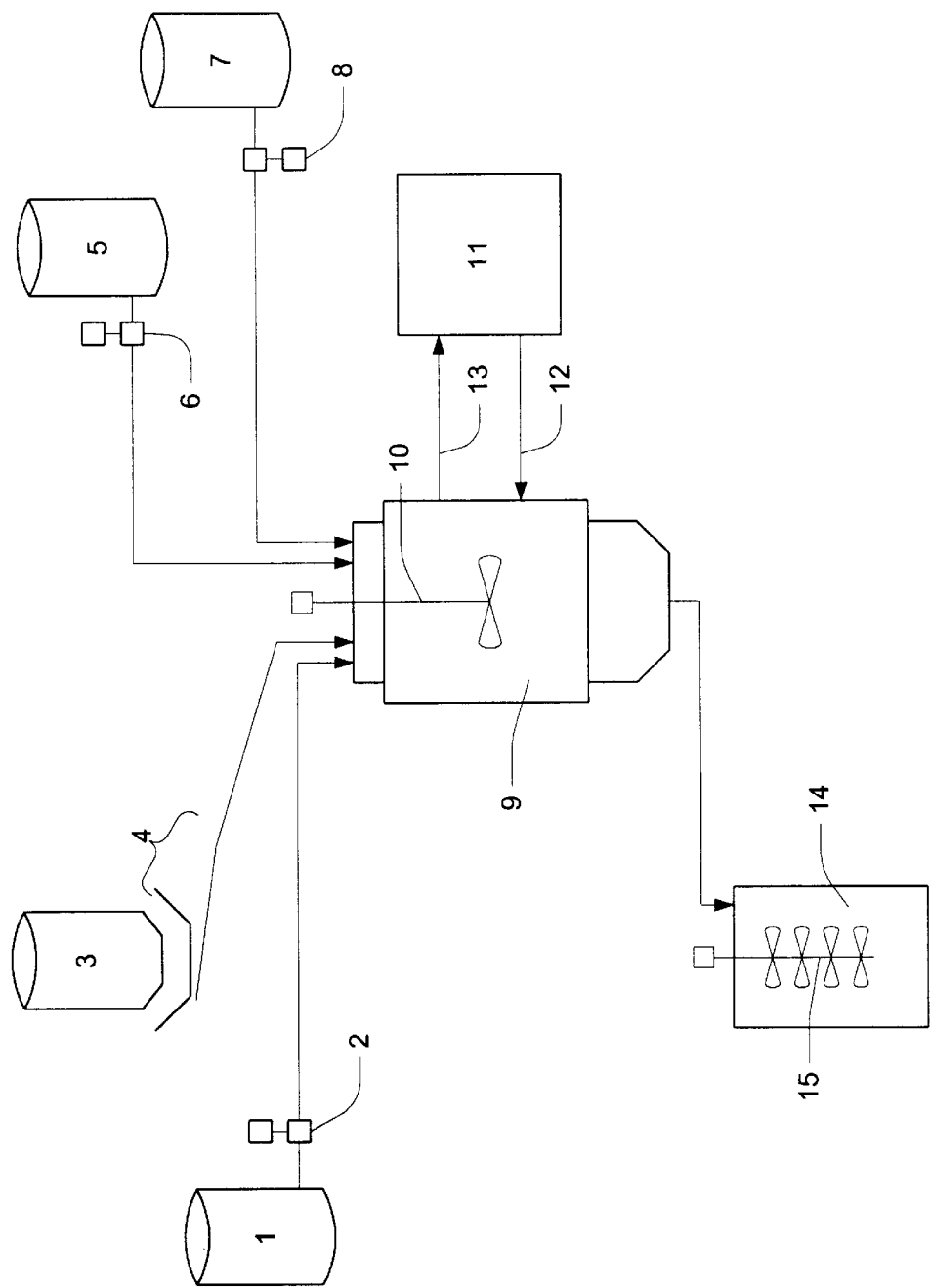
FIG. 1 is a simplified process flow diagram showing the inventive process for the production of the unique magnesium ammonium phosphate hexahydrate slurry.

FIG. 1 shows a simplified process flow diagram of the process of the present invention which includes as the main reactor, jacketed reactor 9. Jacketed reactor 9 is first supplied with water which may be pumped from water tank 1 using water pump 2 to initially charge jacketed reactor 9. It is preferred not to use chlorinated water. The amount of water may be adjusted as required to provide the preferred solids content of about 33 wt. % to about 42 wt. % in the slurry product depending upon the concentration of the other starting materials, particularly the ammonia and phosphoric acid.

Next, magnesium hydroxide powder is added from storage hopper 3 through metering or weighing transfer facilities 4 into jacketed reactor 9. The magnesium hydroxide powder should be added to the water then mixed utilizing high shear mixing with cooling water being supplied to jacketed reactor 9.

Unless special procedures are used during the manufacture of the magnesium hydroxide, the magnesium hydroxide is supplied in a particle size of at least about 5 to 6 microns or larger. With this particle size as a starting material, the finished magnesium ammonium phosphate product particle size is found to be much larger.

It is important to use a magnesium hydroxide supply which has a very small particle size of generally about 2 microns. In addition to using dry powder, it is possible to use a magnesium hydroxide slurry, as long as the particles are in the about 2 micron size. It is believed that if larger particle size magnesium hydroxide is used, that the reaction will not go to completion and unreacted magnesium hydroxide will be present in the product slurry. If a magnesium hydroxide slurry were used, it would be necessary to adjust the initial water charge to provide a final product with about a 35 wt. % solids content.

After the initial charge of magnesium hydroxide, aqua ammonia (ammonium hydroxide) is charged from ammonia tank 5 through metering ammonia pump 6 to jacketed reactor 9. After the initial charge of magnesium hydroxide has begun, the addition of the ammonium hydroxide may be conducted simultaneously with the ongoing addition of magnesium hydroxide as long as adequate mixing is provided, preferably high shear mixing. As an alternative to aqua ammonia, anhydrous ammonia could be used, it would, however, be necessary to adjust the initial water charge to provide a final product with about a 35 wt. % solids content.

After at least about 10% of the ammonium hydroxide has been added and while maintaining an excess of ammonia, phosphoric acid from tank 7 through metering pump 8 is preferably added simultaneously with the ongoing addition of ammonium hydroxide. This addition should be conducted such as to bring the temperature of the reacting mix up to about 105° F. as quickly as possible. During the completion of the phosphoric acid addition, temperatures should be kept in the range of 105 to 110° F., but should not be allowed to exceed 115° F. The rate of addition of phosphoric acid is limited by the chilled water supply 12 temperature, as well as the heat exchange area of the jacketed reactor 9. The addition of the phosphoric acid causes an exothermic reaction and the produced heat should preferably be removed at a rate sufficient to control the reaction temperature in the range of 105 to 110° F. Jacketed reactor 9 and agitator 10 should be designed to provide suitably high shearing agitation. It is preferred that agitator 10 have high shear knife blades. It has been found that a Littleford Day, Inc. (Florence, Ky.) DAYMAX 10 DISPERSER provides suitably high shear agitation for a 10 gallon batch. The DAYMAX 10 DISPERSER rotor speed is 3600 rpm with a tip speed of 7,000 feet per minute. Jacketed reactor 9 is supplied with chilled water from a water chiller 11 utilizing chilled water supply 12 and return 13 lines. Preferably, the chilled water temperature should be about 40 to about 45° F. It has been found that for a jacketed reactor 9 having a heat transfer surface of approximately 75 sq. in./gal. that a chiller duty of 5 tons of refrigeration/10 gal. product (0.5 tons/gal.) is suitable.

It is preferable to complete the reaction with a pH of the jacketed reactor 9 solution at about a pH of 6.4–6.5.

After the reaction is suitably complete, the product from jacketed reactor 9 is transferred to the product tank 14 with a stirrer 15 to keep the particles in suspension. Also, stirrer 15 helps the reaction continue to completion. In product tank 14, it is preferable to keep the product magnesium ammonium phosphate slurry at a temperature of 95° or below to prevent caking or crusting of the product as has been observed by the inventor at temperatures of about 110° and above.

In the making of the inventive magnesium ammonium phosphate hexahydrate slurry, it is important to begin with a magnesium hydroxide powder (or slurry) having a small particle size such that the final magnesium ammonium phosphate product particle remains small in size. It is believed that for the process disclosed, a surface reaction occurs on the magnesium hydroxide particles upon the addition of the ammonia and phosphoric acid, and thus, the final product particle size is larger than the initial magnesium hydroxide particle size. It is believed that if a larger particle size magnesium hydroxide is used, that the cores of the magnesium hydroxide particles will not react to completion and unreacted magnesium hydroxide will be present in the product slurry.

The inventive process may be summarized as follows:

| Material Feed | Conc. | lbs. |
| --- | --- | --- |
| Water | 100% | 54.4 |
| Mg(OH)2 | 100% | 8.3 |
| NH3 | 29% | 10.7 |
| H3PO4 | 75% | 18.6 |

| Time (min) | Procedure | Comments |
| --- | --- | --- |
| 0–3 | initial water charge | |
| 3–6 | all magnesium hydroxide changed | |
| 6–7 | mixing | high shear |
| 7–8 | ammonium feed | |
| 7½–15 | phosphoric acid feed | preferred to have excess of ammonia present during phosphoric acid feed; preferred to limit phosphoric acid feed so as to not exceed 110° F. |
| 16–20 | cooling to 95° F. | |
| 20+ | discharge system | |

These are typical run conditions for a 10 gallon/100 lb. batch made in a DAYMAX 10 DISPERSER. Other size batches could be designed accordingly to meet the general procedures set out above.

For the measurement of particle size, one suitable method is to use a polarized light microscope (PLM) with suitable magnification. For example, an analysis using a polarized light microscope was conducted by Breed and McGill, L.L.C. of Muscle Shoals, Ala. The PLM had magnification powers of 100× and 400×. With the PLM used, for the 100×, each division on the scale was 10 microns, and for the 400× each division on the scale was 2.5 microns. This was used to read the longest side of the crystal. The accuracy of this PLM is believed to be within 1 micron of the actual value. The samples were examined in slurry form after shaking and stirring with a spatula and putting a drop on a slide along with a drop of water to disperse the crystals. It is believed that higher accuracy is achieved using a MICROMERITICS (Norcross, e George) SEDIGRAPH 5100 particle size analyzer which uses the principles of sedimentation. Additionally, as the magnesium ammonium phosphate particles are locally charged, the particles may attract each other causing agglomerates which need to be broken up, for example, with shear mixing before the measurement of the particle size. For purposes of this patent application, the particle sizes are for the non-agglomerated particles.

It is believed that if excess ammonia is not maintained during the phosphoric acid feed, that the compound newberyite ($MgHPO_4 \cdot 3H_2O$) will form, often of large crystals of 20 microns or larger. Thus, the formation of newberyite may be minimized by maintaining an excess of ammonia.

In the process of the present invention for making the inventive magnesium ammonium phosphate hexahydrate slurry, the formation of newberyite (magnesium hydrogen phosphate trihydrate) and ammonium phosphate also occurs. When making the hexahydrate product, it is preferred that the production of the newberyite and ammonium phosphate be minimized, preferably the compounds are present in a combined amount of not more than about 8 wt. % of the slurry. It has been found that the newberyite produces large crystals and more reactor scale and thus reduces heat transfer, causing excessive reaction time and downtime for removing scale.

EXAMPLE 1

| Starting Materials | Conc. | lbs. |
|---|---|---|
| Water | 100% | 54.2 |
| Phosphoric acid | 85% | 17.38 |
| Ammonia | 19% | 13.51 |
| Magnesium hydroxide | 100% | 8.79 |

| Time (Min) | Procedure | Reactor Temp (° F.) |
|---|---|---|
| 0 | Charge water & magnesium hydroxide. Start mixer. | Amb |
| 1 | Begin ammonia addition. | 64 |
| 2 | Ammonia in @ 2'20" | 64 |
| 3 | Start phosphoric add in. | 64 |
| 5 |  | 72 |
| 6 | All phosphoric in @ 6'10" | 94 |
| 7 |  | 117 |
| 10 | Stop & inspect. Looks good. Discharge | 118 |

All the water was added to the reactor as an initial charge. While maintaining good agitation, the magnesium hydroxide was slurried into the water. With continued agitation, the ammonia was slowly added. There was a slight temperature rise. Next, the phosphoric acid was slowly added to the slurry. A large temperature rise occurred. This reaction resulted in a smooth slurry with very little water separation which is an indication of uniform small particles.

In this example, the mixing was done with a LITTLE-FORD DAYMAX DISPERSER (Littleford Day, Inc., Florence, Ky.).

This resulted in a magnesium ammonium phosphate hexahydrate slurry which appeared as a smooth slurry with very little water separation having a specific gravity of 1.16, a pH of 7, with 37.42 wt. % solids in the slurry.

The composition of the magnesium ammonium phosphate hexahydrate slurry was as follows:

| Compound | wt. % in slurry |
|---|---|
| Magnesium (Mg) | 3.71 |
| Nitrogen (N) | 2.14 |
| Phosphate (PO$_4$) | 14.47 |

-continued

| Example 2 | | |
|---|---|---|
| Material Feed | Conc. | lbs. |
| Water | 100% | 54.4 |
| Mg(OH)2 | 100% | 8.3 |
| NH3 | 29% | 10.7 |
| H3PO4 | 75% | 18.6 |

| Time (Min) | Procedure | Reactor Temp (° F.) | CW fm Jacket (° F.) | CW to Jacket (° F.) |
|---|---|---|---|---|
| 00 | Start Mg(OH)2 Feed |  |  |  |
| 03 | Stop Mg(OH)2 Feed |  |  |  |
| 04 | Start NH3 Feed | 70 | 43.5 | 43.3 |
| 05 | Stop NH3 Feed |  |  |  |
| 06 | Start Phos Feed | 101 | 45.4 | 41.5 |
| 08 |  | 105 | 50.1 | 41.3 |
| 10 |  | 105 | 53.2 | 42.0 |
| 12 |  | 106 | 53.9 | 43.4 |
| 14 |  | 106 | 54.8 | 42.8 |
| 16 |  | 105 | 55.5 | 43.1 |
| 17 | Finish H3PO4 Charge | 107 | 55.4 | 43.3 |
| 20 | Discharge System | 95 | 54.0 | 43.5 |

Max. Temp. during reaction 107° F.

| Product |
|---|
| Net Wt. 100 lbs. |
| Appearance: smooth slurry |
| pH 6.6 |
| SpGr 1.185 |
| 34.7 wt. % solids |

There are several general observations which may be made from the two examples. In both examples, the product appeared as a smooth slurry with very little water separation. This is an indication of uniform small particles with significantly reduced settling compared with previously known magnesium ammonium phosphate slurries. Also, each of the examples resulted in a slurry of approximately 35 wt. % solids. Example 1 was slightly higher because of the water balance utilized. The procedure utilized in Example 1 was completed in about 10 minutes. This is much faster than the typical procedure noted above and Example 2. This shortened procedure time is due to the Example 1 apparatus having more cooling capacity such that the phosphoric acid could be added faster. Also the temperature was allowed to go above the desired 110° F.

Chemical reaction (curing) takes place for about 5–6 days after production. This is evidenced by a 2–3° F. temperature rise in product tank 14 over the first 24 hour period. Also, over a longer period, the pH typically increases from about 6.5 to about 7.5 which is believed due to magnesium displacing ammonia in diammonium phosphate according to the reaction:

$$Mg(OH)_2+(NH_4)_2HPO_4+4H_2O \rightarrow MgNH_4PO_4.6H_2O+NH_3$$

The magnesium ammonium phosphate hexahydrate slurry produced as described above may be converted, preferably in slurry form, to the monohydrate form by heating to the boiling point in the presence of excess water at atmospheric pressure or heating to the boiling point while maintaining a very moderate hydrostatic pressure. In converting to the monohydrate form, it is preferable to maintain a small particle size.

The boiling step is conducted at about 198° F. to about 205° F., and preferably at about 198° F. to about 200° F. The conversion occurs quickly once the boiling point is reached. It was determined that heating to less than about 196° F. at atmospheric pressure did not result in the hexahydrate slurry being quickly converted to the monohydrate slurry.

Thus, the overall process for producing the present inventive magnesium ammonium phosphate monohydrate slurry may be summarized as follows: (a) obtaining a magnesium hydroxide slurry having magnesium hydroxide particles wherein at least about 55 wt. % of the particles have a size less than about 2 microns; (b) then adding ammonia; (c) while maintaining an excess of ammonia and cooling, adding phosphoric acid at a rate so as not to exceed a temperature of about 110° F.; (d) producing a magnesium ammonium phosphate hexahydrate slurry; (e) heating the magnesium ammonium phosphate hexahydrate slurry to its boiling point.

Figure 2:
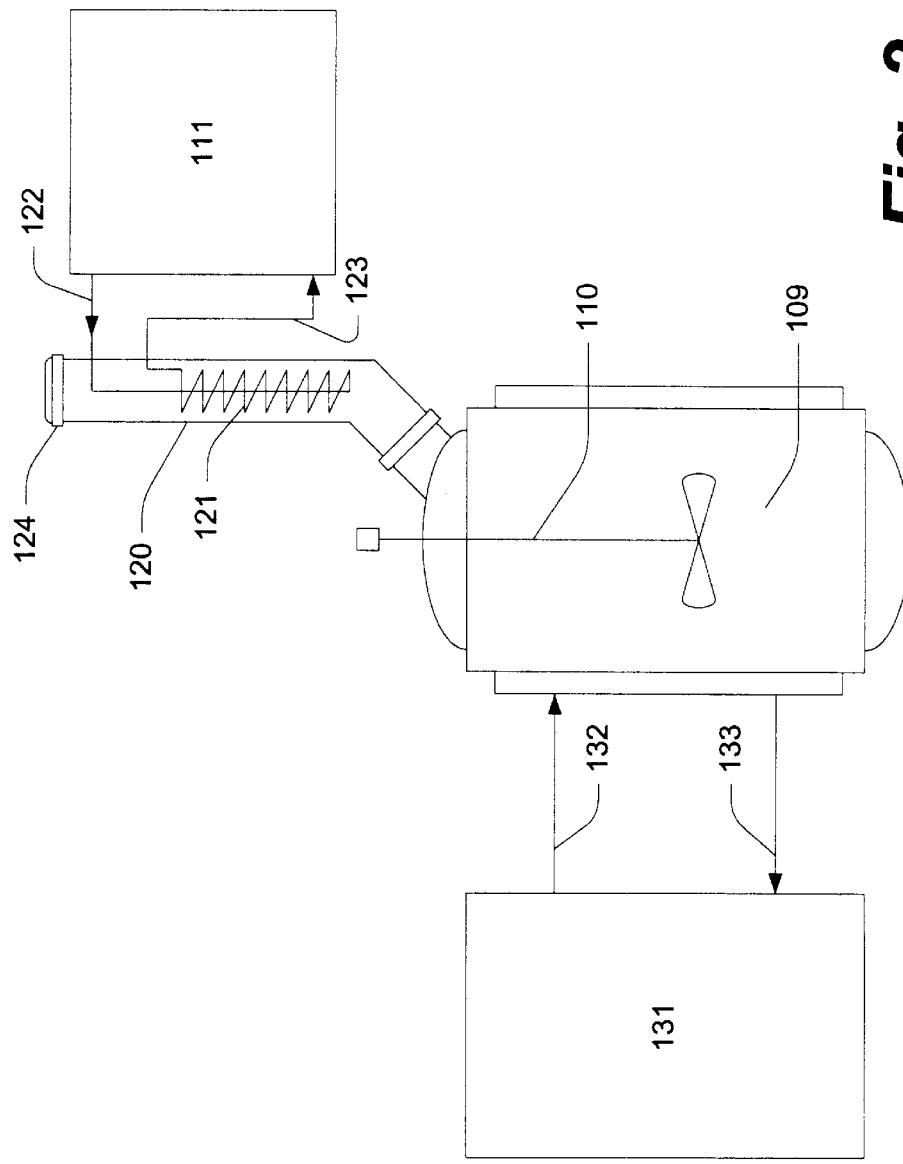
FIG. 2 is a simplified diagram of equipment which may be used to convert a hexahydrate slurry to a monohydrate slurry.

FIG. 2 shows a simplified diagram of equipment which may be used to convert the hexahydrate slurry to the monohydrate slurry. The equipment includes a jacketed reactor 109 which preferably includes an agitator 110 and a reflux stack 120. The reflux stack 120 preferably includes a reflux heat exchanger coil 121 supplied with circulating chilled water from water chiller 111, chilled water supply line 122 and chilled water return line 123. Also, the reflux stack 120 preferably includes a safety release valve 124 which maintains a slight positive pressure of about 10–20 inches of water on the jacketed reactor 109. Steam generator 131 supplies steam to jacketed reactor 109 through steam supply line 132, and the steam/condensate is returned to steam generator 131 via condensate return line 133.

The reflux stack 120, reflux heat exchanger coil 121, and circulating chilled water system 111, 122, 123 are preferably designed to minimize the release of water vapor while maintaining atmospheric pressure on jacketed reactor 109 during the heating of the hexahydrate slurry.

Jacketed reactor 109 may be a jacketed DAYMAX 10 DISPERSER or other suitable vessel.

EXAMPLE 3

Bench Scale Procedure for Boiling Test
(Conversion of Struvite to Dittmarite)

1. Set up Buchner funnel with Whatman #114 (15 cm) filter paper in a 500 ml filtering flask. Use a 500 ml three neck boiling flask, all neck sizes 24/40 (Pyrex).
2. Fill boiling flask with 250 ml of the AMP struvite slurry.
3. Using a TM 106 heating mantle (High Heat) Glas-Col model, set flask in heating mantle.
4. Using a 400 mm condenser with 24/40 fritted glass end, set in either side of 24/40 neck boiling flask.
5. Place thermocouple with rubber stopper in opposite side of boiling flask. Place a rubber stopper in the condenser vent to hold a slight back pressure on the system.
6. Turn on water to condenser.
7. Turn on power to thermocouple and get initial temp of slurry product.
8. Turn on heating mantle to 70% power. Monitor temperature every minute for the duration of the test; record on log sheet.
9. Monitor temperature of slurry product until the slurry starts to boil (approx. 94 deg C) Start test time for boiling duration.
10. When the Amp slurry starts to boil, turn the heating mantle down to 50% power.
11. When test time is over shut off heating mantle.
12. Remove condenser and thermnocouple.
13. With a hot pad, remove three neck boiling flask, and filter the boiling slurry in the Buchner funnel.
14. Triple rinse with acetone.
15. Leave vacuum on the filter for a minimum of four hours and dry at 30 deg. C for 12 hours. Sample is now ready for analysis.

Results

| Sample ID | Description | % N | X-ray diffraction Monohydrate | X-ray diffraction Hexahydrate |
|---|---|---|---|---|
| A | struvite slurry pH = 7.6 (base struvite material) | 6.21% | None detectible | Major |
| 1 | 60 min boiling test | 8.97% | Major | None detectible |
| 2 | 90 min boiling test | 9.02% | | |
| 3 | 2 hr boiling test | 8.99% | | |
| 4 | 4 hr boiling test | 8.90% | Major | None detectible |
| 5 | 15 min boiling test | 9.22% | | |
| 6 | 30 min boiling test | 9.25% | | |
| 7 | 5 min boilin test | 9.16% | | |

In each boiling test, the filtered solids were tested by PLM analysis and it was determined to be dittmarite of high purity. A concern existed that the PLM analysis showed the majority of particles to be in the about 4 micron to about 60 micron range and indicated large crystals or agglomeration of smaller particles of dittmarite were being formed. A DREMEL stirring tool (1/8" SS rod bent approximately 30° on end) was placed in the center neck of the boiling flask and the mixture was stirred throughout the heat up and a 5 minute boiling period. The filter product from this test proved to be very pure Dittmarite of a particle size consistent with the initial struvite from which it was prepared. MICROMERITICS reported mean, mode and median particle sizes of 6.164, 5.309, and 4.943 microns respectively on the dittmarite product. The particle size, according to PLM analysis was in agreement with MICROMERITICS' report. The percentage of nitrogen was 9.1%.

The composition of the magnesium ammonium phosphate monohydrate slurry formed as described above is typically as follows:

| Compound | wt. % in slurry |
|---|---|
| Magnesium (Mg) | 3.71 |
| Nitrogen (N) | 2.14 |
| Phosphate ($PO_4$) | 14.47 |

The magnesium ammonium phosphate monohydrate slurry formed as described typically has a pH from about 6.8 to about 7.4.

During testing, it was determined that if, upon heating or boiling, any appreciable water vapor is lost from an approximately 35 wt. % (solids content) hexahydrate slurry, that a solid mass of uncertain chemical composition formed. It is preferable not to form a solid mass and to maintain the magnesium ammonium phosphate in a slurry form at all times. This may be accomplished in one of several ways. Testing may be used to determine the water content at which the solid forms and sufficient additional water may be added to replace lost water vapor upon heating and boiling. Also, a reflux stack with condenser, as described above, may be utilized to condense and return water which evaporates upon heating and boiling to prevent loss of any appreciable water vapor and to prevent the formation of the solid mass. The reflux stack with condenser may also reduce the release of trace amounts of ammonia. Further, the hexahydrate slurry may be heated to the boiling point in a closed system while maintaining a very moderate hydrostatic pressure, sufficient to prevent the loss of water.

Heating the hexahydrate slurry to the boiling point while maintaining a very moderate pressure may well be the preferred method as it is simpler and easier to control, any leaks allowing water vapor to escape would be more apparent, and it requires less equipment, i.e., a refrigerated chiller and condenser system is not required. However, there is some indication that the atmospheric pressure process utilizing a reflux stack with condenser yields a higher quality monohydrate product, i.e., less contaminants, than the closed system process which maintains a very moderate hydrostatic pressure.

An about 35 wt. % (solids content) hexahydrate slurry containing about 65 wt. % water is converted to an about 23 wt. % (solids content) monohydrate slurry containing about 77 wt. % water. Preferably, the monohydrate slurry has an about 21 wt. % to about 25 wt. % solids content.

It is preferred to have a small solid particle size in the formed monohydrate slurry to provide for the advantages of reduced settling, improved consistency when dispersed and improved reaction with other compounds. It is preferred that about 85 wt. % of the solid particles have a particle size of less than about 8 microns. A monohydrate slurry produced from the hexahydrate slurry as described above has about 85 wt. % of the solid particles less than about 8 microns. Alternatively, if a monohydrate slurry having a smaller particle size is desired, the hexahydrate slurry can be wet milled to an about 2 to about 3 micron particle size prior to the boiling step, and about 75 wt. % of the formed monohydrate slurry particles will have a size of less than about 3 microns.

It is preferable to boil the hexahydrate slurry just prior to the intended use of the monohydrate slurry product. This is because, at room temperature in the presence of excess water, a monohydrate slurry will slowly revert back to a hexahydrate slurry.

The present inventive product and process is advantageous over known magnesium ammonium phosphate products and processes for the production of magnesium ammonium phosphate as the magnesium ammonium phosphate hexahydrate and monohydrate slurries have significantly smaller. particles than known magnesium ammonium phosphate slurries. The slurries of the present invention with the smaller particles significantly reduces settling, improves consistency for dispersion and improves control over reactions with other compounds.

Having described the invention above, various modifications of the techniques, procedures, material, and equipment will be apparent to those skilled in the art. It is intended that all such variations within the scope and spirit of the invention be included within the scope of the appended claims.

What is claimed is:

1. A magnesium ammonium phosphate slurry, comprising:
   from about 21 wt. % to about 25 wt. % solid magnesium ammonium phosphate monohydrate particles, wherein at least about 85 wt. % of the particles have a size less than about 8 microns; and
   from about 75 wt. % to about 79 wt. % free water,
   where the slurry has a pH from about 6.8 to about 7.4.

2. The slurry of claim 1, comprising about 3.7 wt. % magnesium, about 2.1 wt. % nitrogen, and about 14.5 wt. % phosphate.

3. A process for producing a magnesium ammonium phosphate monohydrate slurry, comprising the steps of:
   (a) obtaining a magnesium hydroxide slurry having magnesium hydroxide particles wherein at least about 55 wt. % of the particles have a size less than about 2 microns;
   (b) then adding ammonia;
   (c) while maintaining an excess of ammonia and cooling, adding phosphoric acid at a rate so as not to exceed a temperature of about 110° F.;
   (d) producing a magnesium ammonium phosphate hexahydrate slurry;
   (e) heating the magnesium ammonium phosphate hexahydrate slurry to its boiling point;
wherein said monohydrate slurry has a slurry particle concentration of about 21 wt % to about 25 wt % and at least about 85 wt % of the particles have a size less than about 8 microns.

4. The process of claim 3, wherein the heating the magnesium ammonium phosphate hexahydrate slurry step occurs under atmospheric pressure with sufficient excess water present to prevent the conversion of the slurry to a solid form.

5. The process of claim 3, wherein the heating the magnesium ammonium phosphate hexahydrate step occurs in a vessel under atmospheric pressure, wherein the vessel includes a reflux stack with condenser.

6. The process of claim 3, wherein the heating the magnesium ammonium phosphate hexahydrate slurry step occurs at a pressure sufficient to prevent the loss of water vapor so as to prevent the conversion of the slurry to a solid form.

7. The process of claim 3, wherein the produced magnesium ammonium phosphate hexahydrate slurry has from about 33 wt. % to about 42 wt. % solid magnesium ammonium phosphate hexahydrate particles, wherein at least about 85 wt. % of the particles have a size from about 2 microns to about 7 microns; and
   from about 58 wt. % to about 67 wt. % free water.

8. The process of claim 3, wherein the produced magnesium ammonium phosphate hexahydrate slurry comprises about 3.7 wt. % magnesium, about 2.1 wt. % nitrogen, and about 14.5 wt. % phosphate.

9. The process of claim 3, wherein, prior to the heating the magnesium ammonium phosphate hexahydrate slurry step, the produced magnesium ammonium phosphate hexahydrate slurry is wet milled to a particle size of about 2 to about 3 microns.

10. A magnesium ammonium monohydrate slurry produced by a process comprising the steps of:
   (a) obtaining a magnesium hydroxide slurry having magnesium hydroxide particles wherein at least about 55 wt. % of the particles have a size less than about 2 microns;
   (b) then adding ammonia;
   (c) while maintaining an excess of ammonia and cooling, adding phosphoric acid at a rate so as not to exceed a temperature of about 110° F.;
   (d) producing a magnesium ammonium phosphate hexahydrate slurry;

(e) heating the magnesium ammonium phosphate hexahydrate slurry to its boiling point;

wherein said monohydrate slurry has a slurry particle concentration of about 21 wt % to about 25 wt % and at least about 85 wt % of the particles have a size less than about 8 microns.

11. The slurry of claim 10, wherein the slurry comprises:

from about 21 wt. % to about 25 wt. % solid magnesium ammonium phosphate monohydrate particles, wherein at least about 85 wt. % of the particles have a size less than about 8 microns; and from about 75 wt. % to about 79 wt. % free water.

12. The slurry of claim 10, wherein the slurry comprises about 3.7 wt. % magnesium, about 2.1 wt. % nitrogen, and about 14.5 wt. % phosphate.

13. The slurry of claim 10, wherein the heating the magnesium ammonium phosphate hexahydrate slurry step occurs under atmospheric pressure with sufficient excess water present to prevent the conversion of the slurry to a solid form.

14. The slurry of claim 10, wherein the heating the magnesium ammonium phosphate hexahydrate step occurs in a vessel under atmospheric pressure, wherein the vessel includes a reflux stack with condenser.

15. The slurry of claim 10, wherein the heating the magnesium ammonium phosphate hexahydrate slurry step occurs at a pressure sufficient to prevent the loss of water vapor so as to prevent the conversion of the slurry to a solid form.

16. The slurry of claim 10, wherein the produced magnesium ammonium phosphate hexahydrate slurry has from about 33 wt. % to about 42 wt. % solid magnesium ammonium phosphate hexahydrate particles, wherein at least about 85 wt. % of the particles have a size from about 2 microns to about 7 microns; and from about 58 wt. % to about 67 wt. % free water.

17. The slurry of claim 10, wherein the produced magnesium ammonium phosphate hexahydrate slurry comprises about 3.7 wt. % magnesium, about 2.1 wt. % nitrogen, and about 14.5 wt. % phosphate.

18. The slurry of claim 10, wherein, prior to the heating the magnesium ammonium phosphate hexahydrate slurry step, the produced magnesium ammonium phosphate hexahydrate slurry is wet milled to a particle size of about 2 to about 3 microns.

* * * * *